March 22, 1960 H. D. STEVENS 2,929,437
FABRIC EDGE TURNING APPARATUS
Filed March 28, 1958

INVENTOR.
HORACE D. STEVENS
BY W. G. Fraser
ATTY.

United States Patent Office 2,929,437
Patented Mar. 22, 1960

2,929,437

FABRIC EDGE TURNING APPARATUS

Horace D. Stevens, Sarasota, Fla., assignor to The Firestone Tire & Rubber Company, Akron, Ohio, a corporation of Ohio Application March 28, 1958, Serial No. 724,657

5 Claims. (Cl. 154—1.8)

The present invention relates to the preparation of fabric material having a self-adhesive insulating coating and used in the manufacture of articles such as automotive tires. Mort particularly, the invention relates to an apparatus for shaping the edge areas of a longitudinally moving web of fabric having a self-adhesive insulating coating, the fabric having longitudinally aligned edges with a thin fin of adhesive coating extending laterally of the aligned edges.

Until recently in this art, continuous webs of bias-cut fabric material were formed by manually overlapping the ends of successive short strips and pressing the ends together. Such overlap splicing was costly and, unless performed very accurately, would also possibly contribute to irregularity and imbalance of the finished tire. However, there has recently been developed apparatus which automatically performs all functions necessary to butt join or splice the trailing end of one web of bias-cut material to the leading end of a following web of material, without building up the bulk of the fabric in the area of the splice. Such apparatus requires that the end or outside cords of each fabric web be covered with a sufficient amount of rubber or other coating in a self-adhesive condition.

Therefore, it is an object of the present invention to provide improvements in apparatus for the preparation and treatment of the edges of fabric material having a self-adhesive insulating coating for use in the construction of automotive tires and the like.

It is a further object to provide an improved apparatus for shaping the edge areas of a longitudinally moving web of fabric having a self-adhesive insulating coating with longitudinally aligned edges and thin fins of adhesive coating extending laterally of the aligned edges.

These and other objects of the invention, as well as the advantages thereof, will be apparent in view of the following detailed description considered with the attached drawings.

In the preparation of fabric material for use as tire plies, the cords of rayon, nylon, cotton or similar materials are dipped in specially formulated liquid rubber compounds and tension dried. Rubberizing of the fabric then follows and is done on a rubber calender or calenders by applying individual strips (or skim coats) of rubber on each side of the fabric and squeezing the rubber and fabric between the calender rolls sufficiently to cause the rubber to flow between and about each cord, thereby affording uninterrupted rubber insulation of the cords, as will be understood by those familiar with rubberizing by calendering cord tire fabric.

Figure 4:
Fig. 4 is a sectional view of the fabric edge while on a calendering unit and prior to the application of a lower insulating skim coat or layer of rubber.
Figure 5:
Fig. 5 is a sectional view of the fabric edge after application and preparation of a lower layer of coating to form a laterally extending fin.

Referring to Figs. 4 and 5, the rubberized fabric material is indicated generally by the numeral 20 and includes the individual cords 21 and the insulating coating 22. In the finished form of the material 20, the separately applied layers of the coating 22 become bonded homogeneously around and between the cords due to the pressure of the calender rolls. However, for purposes of understanding the present invention, the coating 22 is best described as having an upper layer 22A, a medial layer 22B and a lower layer 22C.

Referring specifically to Fig. 4, the layers 22A and 22B are first applied. The outer edge E is then trued and squared by a suitable means such as a hot knife (not shown) on the calender unit so that the outer edges of layers 22A and 22B are coextensive and longitudinally aligned. Referring specifically to Fig. 5, the lower layer 22C is then applied. The outer edge E' of layer 22C, which is then preferably trued and squared, forms a fin 23. The fin 23 has a thickness which is preferably one-tenth to one-quarter the thickness of the composite material 20. The width of the fin, that is the distance between E and E', is preferably five to ten times the composite thickness of the material 20. In any event, the lower insulating layer 22C is applied so as to form a fin 23 of substantial width in relation to thickness.

Figure 6:
Fig. 6 is a sectional view of the fabric edge after contact and shaping by the apparatus shown in Fig. 3.

In the form of the invention shown, the fin 23 is wrapped around or turned progressively over and bonded to the upper and medial layers 22A and 22B so that the outer edge 24 of the material 20 is shaped in the manner shown in Fig. 6.

Figure 7:
Fig. 7 is a sectional view of an improved butt joint or splice made possible by the present invention.

Fig. 7 is intended to show a typical improved quality butt joint or splice made possible by the specially prepared edge 24 of the material 20. The substantial thickness of adhesive coating provided by wrapping and turning of the fin 23 ensures adhesion between the abutting edges of two strips of bias-cut material.

Figure 1:
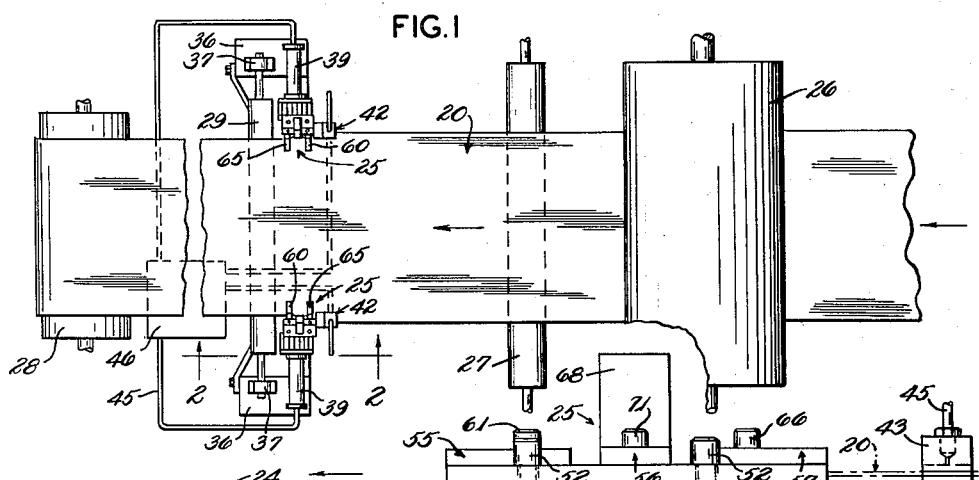
Fig. 1 is a schematic plan view of an installation of apparatus according to the invention between the last roll of a calendering machine and the fabric wind-up reel.

Referring to Fig. 1, it is preferred that both edges of a web of fabric material 20 be prepared simultaneously. Each fin 23 of the upper insulating layer is shaped and bonded to the upper and medial layers 22A and 22B, by an individual edge treating apparatus, indicated generally by the numeral 25. The apparatus 25 for either side of the web 20 are identical except for being opposite hand.

After passage through the calender unit, the last roll of which is indicated at 26, the web 20 is drawn over a first idler support roll 27 by a wind-up reel 28. A second idler support roll 29 is located behind the first to provide a tensioned span of the fabric material to which each edge treating apparatus 25 is applied.

Figure 2:
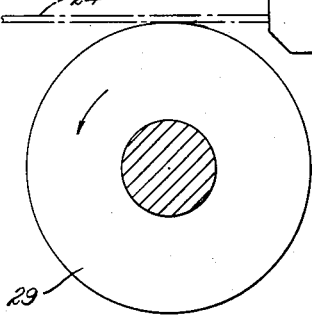
Fig. 2 is an enlarged "left hand" view taken substantially on line 2—2 of Fig. 1.

Referring to Fig. 2, each edge treating apparatus 25 is carried by a guide or mounting block 30. Each block 30 is movably mounted on and stabilized by a pair of parallel slide rods 31. Each pair of slide rods 31 are mounted between a pair of end plates 32, mounted one on either end of a transverse base plate 34 carried on a flange 35. The flange 35 extends upwardly from a support stand 36. Referring to Fig. 1, the second idler support roll 29 may be journaled in bearing blocks 37 carried on the support stand 36. Each edge treating apparatus 25 is moved transversely or laterally of the web of fabric material 20 by a conventional fluid-actuated cylinder 39 mounted on an end plate 32 and having an extensible shaft 40 connected to a slidable block 30. The lateral movement of each edge treating apparatus 25, in response to extension or retraction of each cylinder shaft 40, may be controlled by any suitable web edge position detector means located adjacent and one on either side of the tensioned span of fabric between the rolls 27 and 29 and indicated generally by the numeral 42. In one form of installation in which the apparatus 25 may be employed, the edge detector means 42 is as shown in U.S. Patent No. 2,794,444, issued June 4, 1957, to Frank J. Markey and assigned to Askania Regulator Company, Chicago, Illinois. However, other suitable detecting means, including photo-electric cells and receivers, could also be used.

The purpose of each edge detector means 42 is to position the apparatus 25 in relation to the fin 23 and the edge E' of the web 20, as described in detail below. The detector head 43 is mounted on a bracket 44 extending to one side of a slidable block 30. Suitable piping 45 connects each detector head 43 with a common power source 46 (see Fig. 1) to supply actuating fluid to the cylinders 39.

Each edge treating apparatus 25 includes a rectangular plate 50 securely, yet adjustably, attached to the mounting block 30 as by bolts 52 (see Fig. 2) extending through suitable elongate slots 53 running transversely of the plate 50. The plate 50 carries a front flange 55, a middle or upright flange 56 and a rear flange 57.

The front flange 55 is generally L-shaped and has a vertical face 59. A freely rotatable front belt pulley or roller 60 extends horizontally from the flange face 59 transversely of the fabric edge E. The flange 55 is attached to the plate 50 and is adjustable thereon as by a bolt 61 extending through an elongate slot 62 running longitudinally of the upper surface of the flange.

The rear flange 57 is similar to flange 55 and has a vertical face 64 mounting a horizontal rear belt pulley or roller 65 also extending transversely of the fabric edge E but having a rotational axis preferably slightly above the rotational axis of pulley 60 so that the fabric web 20 will pass smoothly over roller 29. The flange 57 is securely, yet adjustably, attached to the plate 50 as by a bolt 66 (see Fig. 2) extending through a suitable longitudinally elongate slot 67.

The middle flange 56 is generally Z-shaped and has an upright portion 68 terminating in a horizontal portion 69 rotatably mounting a vertically depending middle belt pulley or roller 70. The base of flange 56 is attached to the plate 50 as by a pair of bolts 71 extending through an elongate slot 72 running transversely of the plate 50.

Figure 3:
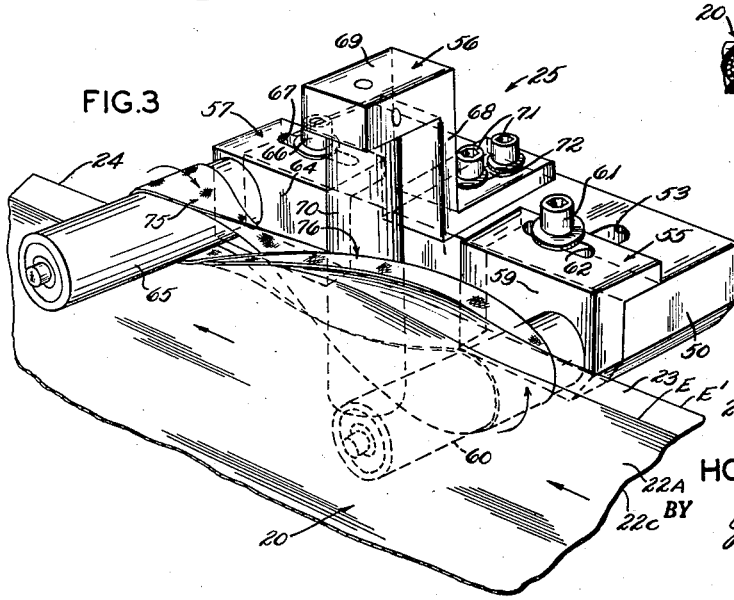
Fig. 3 is a perspective view of apparatus according to the invention for contacting the "right hand" edge of a moving web of fabric.

The fin 23 is wrapped around or turned progressively over and bonded to the upper and medial layers 22A and 22B by an endless belt 75 running between the belt pulleys 60 and 65 both of which are in substantially the same plane as the fabric web 20. The belt 75 is twisted once in the area indicated at 76 so that the upper surface on one belt pulley is inverted to become the lower surface on the other belt pulley. The middle belt pulley 70 is approximately aligned with the edge E of the web and determines the location of the twist area 76. As shown, at pulley 60 the upper surface of the belt 75 frictionally engages the lower layer 22C and the fin 23 and maintains contact therewith during the continuous movement of the belt toward the rear pulley 65, as shown by the arrows in Fig. 3.

As has now been described, the apparatus 25 provides a continuous surface in the form of belt 75 which will efficiently and expeditiously prepare and shape a web of fabric material to form an edge of insulation in a self-adhesive condition. The fin 23 is frictionally engaged by the upper surface of belt 75 as it passes around the front pulley 60. Between the pulley 60 and the twist area 76, the fin 23 is gradually turned upwardly. In the twist area 76, the lateral adjustment of the roller 70 in relation to the fabric edge E ensures that the fin 23 will be exactly parallel with the edge E as the fin 23 completes its initial turning to the upright position and begins to fold over the fabric layer 22A. Between the twist area 76 and the rear pulley 65, the fin 23 is engaged by the under surface of belt 70 and is further turned to a condition of firm adherence to the fabric layers 22A and 22B as shown in Fig. 6.

What is claimed is:

1. Apparatus for shaping the edge area of a longitudinally moving web of tire fabric having a self-adhesive insulating coating, said web having a longitudinally aligned edge and a thin fin of said coating extending from the lower surface of said web and laterally of said aligned edge, comprising, a pair of rollers positioned transversely of said edge, an endless belt extending between said rollers and twisted so that the upper surface on one roller becomes the lower surface on the other roller, said belt contacting the lower surface of said fin and maintaining contact therewith while turning said fin into adhesive engagement with the upper surface of said web, and mechanism between said rollers adjacent said edge that ensures parallel alignment between said edge and said fin while the latter is turning.

2. Apparatus for shaping the edge area of a longitudinally moving web of tire fabric having a self-adhesive insulating coating, said web having a longitudinally aligned edge and a thin fin of said coating extending from the lower surface of said web and laterally of said aligned edge, comprising, a first and second roller having parallel axes positioned in substantially the same plane as said web transversely of said edge, an endless belt extending between said rollers and twisted so that the upper surface on said first roller becomes the lower surface on said second roller, said belt contacting the lower surface of said fin and maintaining contact therewith while turning said fin into adhesive engagement with the upper surface of said web, and a third roller contacting said belt between said first and second rollers and having an axis at substantially right angles thereto and positioned in approximate alignment with said edge.

3. Apparatus for shaping the edge area of a longitudinally moving web of tire fabric having a self-adhesive insulating coating, said web having a longitudinally aligned edge and a thin fin of said coating extending from the lower surface of said web and laterally of said aligned edge, comprising, a first and second roller having parallel axes positioned in substantially the same plane as said web transversely of said edge, an endless belt extending between said rollers and twisted so that the upper surface on said first roller becomes the lower surface on said second roller, the upper surface of said belt on said first roller contacting the lower surface of said fin and maintaining contact therewith while turning said fin into adhesive engagement with the upper surface of said web, and a third roller adjacent said edge between said first and second rollers and having an axis at substantially right angles thereto, said third roller ensuring parallel alignment between said edge and said fin while the latter is turning.

4. Apparatus for shaping the edge area of a longitudinally moving web of tire fabric having a self-adhesive insulating coating, said web having a longitudinally aligned edge and a thin fin of said coating extending from the lower surface of said web and laterally of said aligned edge, comprising, a support adjustable laterally of said edge, a pair of pulleys journaled in said support and extending transversely of said edge, an endless belt extending between said pulleys and twisted so that the upper surface on one pulley becomes the lower surface on the other pulley, said belt frictionally engaging the lower surface of said fin and maintaining contact therewith while turning said fin into adhesive engagement with the upper surface of said web, and mechanism between said pulleys adjacent said edge that ensures parallel alignment between said edge and said fin while the latter is turning.

5. Apparatus for shaping the edge area of a longitudinally moving web of tire fabric having a self-adhesive insulating coating, said web having a longitudinally aligned edge and a thin fin of said coating extending from the lower surface of said web and laterally of said aligned edge, comprising, a support adjustable laterally of said edge, a first and second pulley having parallel axes journaled in said support in substantially the same plane as said web and extending transversely of said web, an endless belt extending between said pulleys and twisted so that the upper surface at said first pulley becomes the lower surface at said second pulley, said belt contacting the lower surface of said fin and maintaining contact therewith while turning said fin into adhesive engagement with the upper surface of said web, and a third pulley journaled in said support at approximately right angles to said edge and contacting said belt between said first and second pulleys.

References Cited in the file of this patent

UNITED STATES PATENTS

| | | |
|---|---|---|
| 1,464,632 | Wayne | Aug. 14, 1923 |
| 1,903,243 | Peck | Mar. 28, 1933 |
| 2,001,575 | James | May 14, 1935 |
| 2,195,959 | Maguire | Apr. 2, 1940 |
| 2,311,085 | Rudolph | Feb. 16, 1943 |
| 2,539,450 | Magill | Jan. 30, 1951 |
| 2,589,944 | Labombarde | Mar. 18, 1952 |